(12) United States Patent
Yin

(10) Patent No.: US 11,006,192 B2
(45) Date of Patent: May 11, 2021

(54) MEDIA-PLAYED LOADING CONTROL METHOD, DEVICE AND STORAGE MEDIUM

(71) Applicant: Beijing Bytedance Network Technology Co., Ltd., Beijing (CN)

(72) Inventor: Guohui Yin, Beijing (CN)

(73) Assignee: Beijing Bytedance Network Technology Co., Ltd., Beijing (CN)

(*) Notice: Subject to any disclaimer, the term of this patent is extended or adjusted under 35 U.S.C. 154(b) by 0 days.

(21) Appl. No.: 17/021,997

(22) Filed: Sep. 15, 2020

(65) Prior Publication Data
US 2020/0413159 A1 Dec. 31, 2020

Related U.S. Application Data

(63) Continuation of application No. PCT/CN2018/103485, filed on Aug. 31, 2018.

(30) Foreign Application Priority Data

May 29, 2018 (CN) .......................... 201810530557.4

(51) Int. Cl.
| | | |
|---|---|---|
| *H04N 7/16* | (2011.01) | |
| *H04N 21/845* | (2011.01) | |
| *H04N 21/435* | (2011.01) | |
| *H04N 21/4782* | (2011.01) | |
| *H04N 21/84* | (2011.01) | |

(52) U.S. Cl.
CPC ....... *H04N 21/8456* (2013.01); *H04N 21/435* (2013.01); *H04N 21/4782* (2013.01); *H04N 21/84* (2013.01)

(58) Field of Classification Search
CPC .... H04N 21/238; H04N 21/239; H04N 21/24; H04N 21/254; H04N 21/2665
See application file for complete search history.

(56) References Cited

U.S. PATENT DOCUMENTS

| | | | | |
|---|---|---|---|---|
| 6,701,316 B1* | 3/2004 | Li | .................... | G06F 16/9574 370/395.41 |
| 2005/0138140 A1* | 6/2005 | Wen | .................... | G06F 16/9574 709/217 |

(Continued)

FOREIGN PATENT DOCUMENTS

| | | |
|---|---|---|
| CN | 102461119 A | 5/2012 |
| CN | 103096133 A | 5/2013 |

(Continued)

OTHER PUBLICATIONS

International Patent Application No. PCT/CN2018/103485; Int'l Search Report; dated Jan. 30, 2019; 2 pages.

*Primary Examiner* — Gigi L Dubasky
(74) *Attorney, Agent, or Firm* — BakerHostetler

(57) ABSTRACT

A media-played loading control method, device and storage medium are provided. The method includes detecting a time span corresponding to media data preloaded by the player in a playing process of a player built-in a webpage, obtaining media data rendering the preloaded media data to satisfy the fixed time span when the time span corresponding to preloaded media data is less than a fixed time span, and sending obtained media data to a media element of the webpage for preloading via a media source extension interface.

18 Claims, 8 Drawing Sheets

(56) References Cited

U.S. PATENT DOCUMENTS

| | | | |
|---|---|---|---|
| 2008/0304766 A1 | 12/2008 | Lee et al. | |
| 2009/0199100 A1 | 8/2009 | Hwang et al. | |
| 2010/0197286 A1* | 8/2010 | Shah | H04W 4/12 455/414.3 |
| 2012/0209969 A1* | 8/2012 | Cheng | G06F 16/9577 709/221 |
| 2014/0146727 A1* | 5/2014 | Segev | H04W 52/0229 370/311 |
| 2017/0242470 A1* | 8/2017 | Fu | G06F 1/324 |
| 2017/0289616 A1* | 10/2017 | Igarashi | H04N 21/431 |

FOREIGN PATENT DOCUMENTS

| | | |
|---|---|---|
| CN | 104954407 A | 9/2015 |
| CN | 106060579 A | 10/2016 |

\* cited by examiner

MEDIA-PLAYED LOADING CONTROL METHOD, DEVICE AND STORAGE MEDIUM

CROSS-REFERENCE TO RELATED APPLICATION

The disclosure is a continuation of PCT application Ser. No. PCT/CN2018/103485, filed on Aug. 31, 2018, which claims the priority benefit of CN application Ser. No. 201810530557.4, filed on May 29, 2018. The entirety of the above-mentioned patent application is hereby incorporated by reference herein and made a part of this specification.

TECHNICAL FIELD

The disclosure relates to a media playing technology, and more particularly to a media-played loading control method, device and storage medium.

DESCRIPTION OF RELATED ART

When a media file is played through a webpage, the webpage preloads subsequent media data based on the current playing point until all the media data from the current playing point to the end time is loaded. Each time when a playing point is switched, the webpage reloads all the media data from the current playing point to the end point. On the one hand, the media data needs to be repeatedly requested to be loaded, and on the other hand, the loaded media data may not be watched by a user (for example, when a user is watching in a skip mode); and this results in unnecessary consumption of traffic and bandwidth by the preloaded media data, while other operations in the webpage is delayed due to the occupation of the network.

SUMMARY

Accordingly, embodiments of the disclosure provide a media-played loading control method, device and storage medium capable of controlling the preloaded media data; as a result, the time span corresponding to the preloaded media data is a fixed time span.

The technical solution of the embodiments of the disclosure is performed as follows.

On a first aspect, an embodiment of the disclosure provides a media-played loading control method, including detecting a time span corresponding to media data preloaded by the player in a playing process of a player built-in a webpage, obtaining media data rendering the preloaded media data to satisfy the fixed time span when the time span corresponding to preloaded media data is less than a fixed time span, and sending obtained media data to a media element of the webpage for preloading via a media source extension interface.

On a second aspect, an embodiment of the disclosure provides a media-played loading control device, including a detector disposed to detect a time span corresponding to media data preloaded by the player in a playing process of a player built-in a webpage, an obtainer disposed to obtain media data rendering the preloaded media data to satisfy a fixed time span when the time span corresponding to pre-loaded media data is less than the fixed time span, and a sender disposed to send obtained media data to a media element of the webpage for preloading via a media source extension interface.

On a third aspect, an embodiment of the disclosure provides a media-played loading control device, including a memory disposed to store an executable instruction, and a processor disposed to follow the executable instruction stored in the memory to implement the media-player loading control method of embodiments of the disclosure.

The executable instruction can be an installation package, a program, codes, a plug-in, a library (a dynamic/static library).

On a fourth aspect, an embodiment of the disclosure further provides a storage medium, storing an executable instruction; when the executable instruction is performed, the media-played loading control method can be implemented.

According to the embodiment disclosed by the disclosure, the following beneficial effects are achieved.

The control of the pre-loaded media data in the playing process of the player is realized, so that the time span corresponding to the pre-loaded media data is a fixed time span, and unnecessary consumption of traffic and bandwidth caused by the fact that the pre-loaded media data are all the media data from the current playing point to the end time is avoided, and the delay of other operations in a webpage caused by the occupation of a network is relieved.

DETAILED DESCRIPTION OF PREFERRED EMBODIMENTS

The disclosure will be further illustrated in detail with reference to embodiments and drawings therewith. Conceivably, embodiments provided as follows are merely a part of embodiments of the disclosure rather than all of embodiments provided by the disclosure. Without confliction, the technical solution recorded by embodiments of the disclosure can be performed by any combination of manners.

It is necessary to clarify that in embodiments of the disclosure, terms such as "comprise", "include" or any other variation are aimed at covering inclusion without exclusion, so that methods or devices including a series of elements not only contain the recorded elements, but also other unlisted elements, or inherent elements to fulfill the embodiments or devices. Without any further limitation, an element defined by a sentence of "include a" do not exclude other relevant elements existing in methods or devices containing the element, such as steps in methods or components in devices, and components can be some circuits, some processors, some programs or software, etc.

For instance, a media-played loading control method of a media-played loading control method provided by an embodiment of the disclosure includes a series of steps, but the media-played loading control method provided by an embodiment of the disclosure is not restricted to the recorded steps. Identically, a media-played loading control device provided by an embodiment of the disclosure includes a series of components, but the device provided by embodiments of the disclosure is not restricted to the recorded components, which can further include components disposed to acquire relevant information or process information.

Before further expressing the disclosure, substantives and technical terms in embodiments of the disclosure will be explained. The substantives and technical terms in the embodiments of the disclosure refer to following definitions.

(1) A media file indicates a file stores encoded media data such as at least one of audio data and video data in a manner of boxes, which likewise contains moov (aka. metadata), namely data expressing the media data. The moov carries media information to ensure media data to be decoded correctly.

For instance, a file encapsulating media data by an MP4 box format is an MP4 file. Typically, the MP4 file stores advanced video coding (AVC), namely H.264, or video data encoded by the MPEG-4 (part 2) standard and audio data encoded by the advanced audio coding (AAC) standard. There is no doubt that other encoding modes of video and audio will not be excluded.

Figure 1:
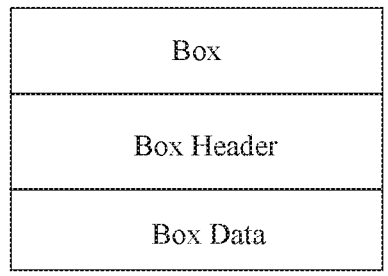
FIG. 1 is an optional structural schematic view of a box provided by an embodiment of the disclosure.

(2) A box is a component of an object oriented defined by a sole type identifier and length, referring to FIG. 1, which is an optional structural schematic view of a box provided by an embodiment of the disclosure, including a box header and box data, and binary data conveying various information filled therein.

Figure 2:
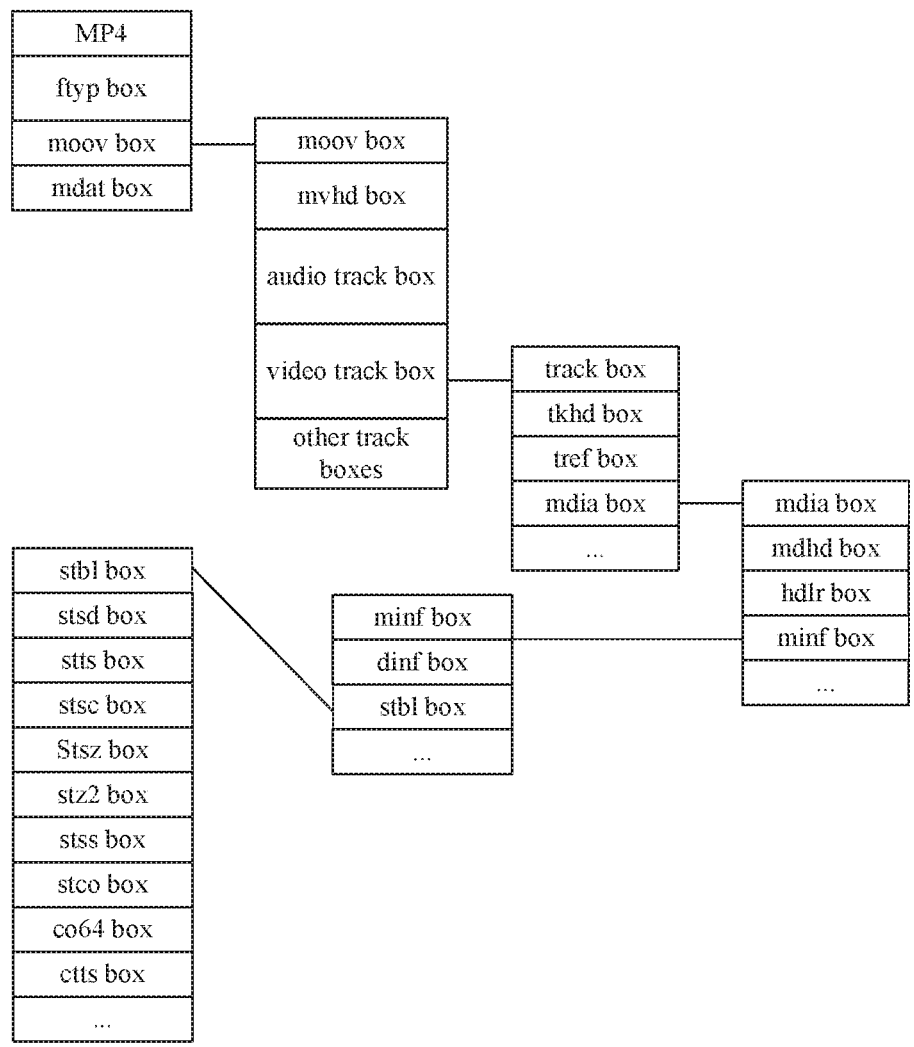
FIG. 2 is an optional schematic view of an encapsulation structure of an MP4 file provided by an embodiment of the disclosure.

The box header includes size and type. The size specifies the volume of the length storage space of the box occupied in the media file. The type specifies the type of the box. Referring to FIG. 2, which is an optional schematic view of an encapsulation structure of an MP4 file in an embodiment of the disclosure. Fundamental types of boxes involved in the MP4 file contain an ftyp box, an moov box and an mdat box.

The box data section can store specific data, and the box is called a data box. The box data section can further encapsulate other types of boxes, and the boxes can be boxes of boxes.

(3) A track is a relevant sample arranged in chronological order in the mdat box. Regarding the media data, the track signifies a video frame sequence or an audio frame sequence, further incorporating a subtitle track synchronized with the video frame sequence. A contiguous set of samples in one track are chunks.

(4) An ftyp box is a box for storing the size, namely a length of occupied bytes, and the type of the file in the media file. As shown in FIG. 2, the binary data stored in the ftyp box describe the type and the compatibility of the file box according to the standard byte length.

(5) An moov box is a box storing moov that is data to depict multimedia data in the mdat box in the media file. Information recorded as binary data stored in the moov box in the MP4 file is called media information.

As shown in FIG. 2, a type of the box of the header of the moov box recorded as binary data is the moov box. The box data division encapsulates an mvhd box storing total information of the MP4 file, which is independent from the MP4 file, and relative to properties of the MP4 file, including time span, creation time and modification time, etc.

The mdat box of the media file can contain sub-boxes corresponding to multi-tracks, such as an audio track box and a video track box. The sub-boxes of the audio track box and the video track box include quotation and description of the media data of corresponding tracks. Necessary sub-boxes include a box describing characteristics and total information such as time span, width and height, which is labelled as a tkhd box, and a box recording media information of tracks such as media types and sampling information, which is labeled as an mdia box.

The sub-boxes encapsulated in the mdia box can include the a box recording relevant properties and contents of tracks, which is labeled as an mdhd box, a box recording playing procedure information of media, which is labeled as an hdlr box, a box describing the media information of media data in tracks, which is labeled as an minf box; the minf box further encapsulates a sub-box to interpret how to locate media information, which is labeled as a dinf box, and a sub-box for recording all the time information such as decoding time and displaying time, location information and encoding/decoding information of samples in tracks, which is labeled as an stbl box.

Figure 3:
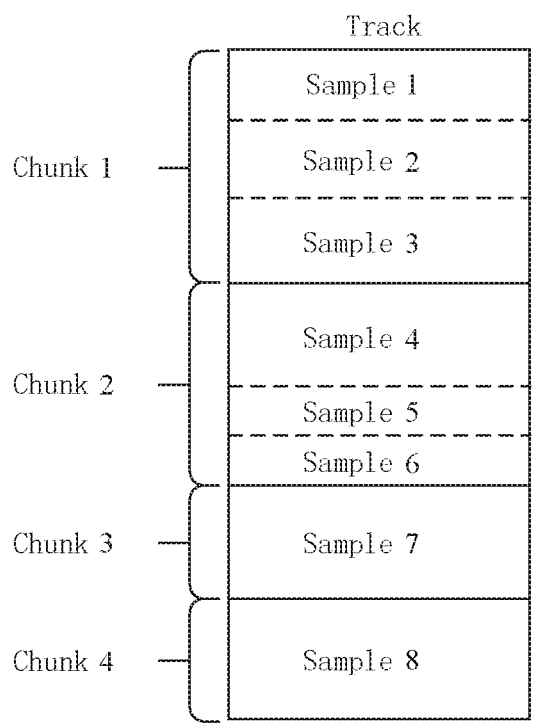
FIG. 3 is a structural schematic view of an mdat box storing media data in a media file provided by an embodiment of the disclosure.

Referring to FIG. 3, which is a structural schematic view of an mdat box storing media data in a media file provided by an embodiment of the disclosure. The time, type, size and location in the mdat box of samples can be explained by media information recognized from binary data in the stbl box. Each of the sub-boxes in the stbl box will be illustrated as follows.

The stsd box includes a sample description table. According to different encoding schemes and quantities of files storing data, each media file can have one or more description table(s). The description information of each sample can be found through searching the description table. The description information can guarantee correctness in decoding samples. Each media type stores corresponding description information. For instance, with respect to a video medium, the description information is a structure of an image.

The stts box stores time span information of samples, as well as providing a table for mapping time such as decoding time and the sequence number of a sample. A sample at any time of the media file can be located by the stts box; the stts box further uses other tables to map the size and pointer of a sample. Each entry offers sequence numbers of successive samples in an identical time offset and the offset of samples. An intact mapping table of time-sample can be established by progressively increasing the offsets. A computational formula is as follows.

$$DT(n+1)=DT(n)+STTS(n) \quad (1)$$

Where STTS(n) is the $n^{th}$ information without compression; DT(n) is the display time of the nth sample. An order of the samples is in accordance with the time sequence; therefore, the offset will always be nonnegative. Generally, DT starts from 0, and a computational formula of DT is as follows.

$$DT(i)=\text{SUM (for } j=0 \text{ to } i-1 \text{ of delta}(j)) \quad (2)$$

The sum of all offsets is the time span of the media data in tracks.

An stss box records sequence numbers of key frames in the media file.

An stsc box records a mapping relation between samples and chunks storing the samples. The table maps the relation between the sequence numbers of samples and those of chunks. The chunk containing a specific sample can be determined by searching the table.

An stco box defines the location of each chunk in tracks. The location is represented by the offset of an initial byte of the mdat box and a length corresponding to the initial byte, namely a size.

An stsz box records a volume/size of each sample in the media file.

(6) An mdat box is a box for storing multimedia data in the media file. For instance, an mdat box in an MP4 file, as shown in FIG. 3, a sample is a unit stored in the mdat box. In a chunk stored in the media file, lengths of chunks and those of samples can mutually be different.

(7) A fragmented media file is a sub-file formed by dividing the media file. Each fragmented media file can be decoded independently.

Taking the MP4 file as an example, the media data in the MP4 file is divided according to the key frames. The divided media data and corresponding moov are encapsulated to form a fragmented MP4 (FMP4) file. The moov in each FMP4 file can ensure the media data to be decoded correctly.

Figure 4:
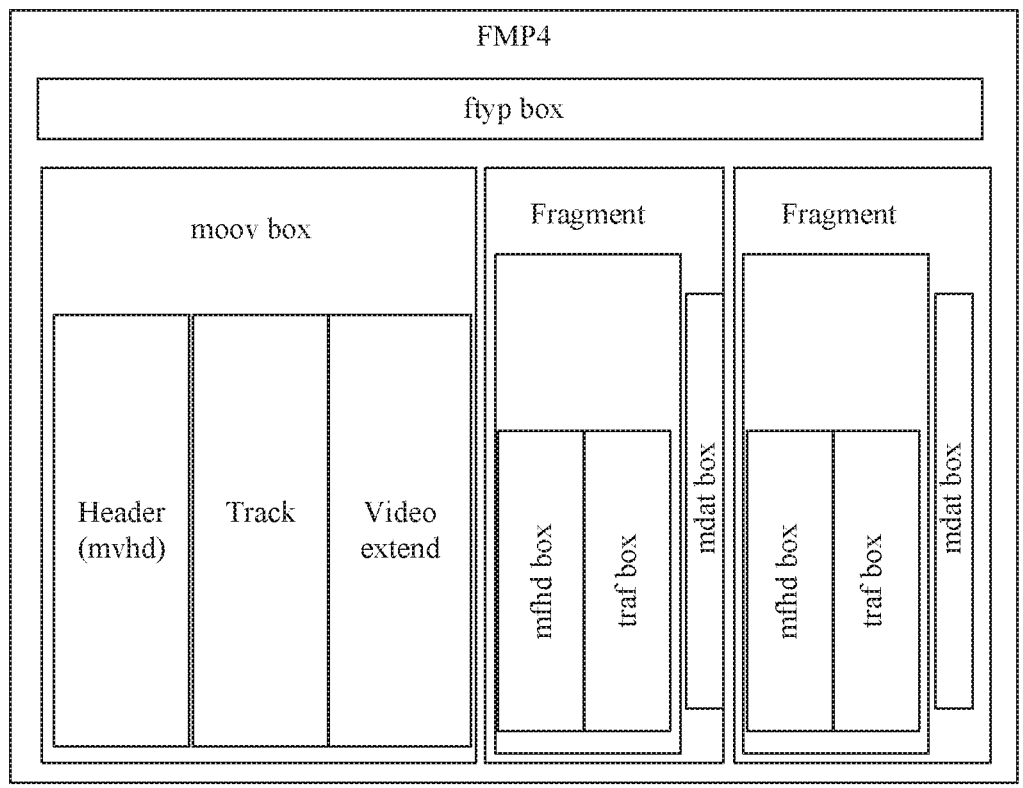
FIG. 4 is an optional schematic view of an encapsulation structure of a fragmented MP4 file provided by an embodiment of the disclosure.

For instance, when the MP4 file as shown in FIG. 2 is converted to multiple FMP4 files, referring to FIG. 4, which is an optional schematic view of an encapsulation structure of an FMP4 file provided by an embodiment of the disclosure. One MP4 file can be converted to be multiple FMP4 files. Each FMP4 file includes three basic boxes: an moov box, an moof box and an mdat box.

The moov box includes the MP4-leveled moov, which is used for describing all media data of the MP4 file that the FMP4 files derived from, such as the time span, creation time and modification time of the MP4 file.

An moof box stores the fragmented moov, which describes media data encapsulated in the FMP4 file therein to ensure the media data in the FMP4 file to be able to be decoded.

One moof box and one mdat box constitutes one fragment of the fragmented MP4 file. One fragmented MP4 file can include one or more fragment(s). The moov encapsulated in each fragment guarantees media data encapsulated in fragments to be decoded independently.

(8) A media source extensions (MSE) interface is an interface orienting players embedded in the network, which is interpreted by an interpreter during loading a webpage and achieved by running the frontend programming language such as JavaScript, with a function of providing playing media stream of the media element invoking Hyper Text Markup Language (HTML) to players, such as utilizing the video element and the audio element to perform functions of the video/audio.

(9) A streaming media encapsulation format streaming media format is a media file encapsulating media data to be streaming media. The media file is unnecessary to be completely downloaded or additionally transcoded for being decoded and played. In other words, the encapsulation technology originally supports downing and playing at the same time. A typical file of the streaming media encapsulation format streaming media format can be such as a TS media file fragmentation based on the HTTP Live Streaming (HLS) technique, flash video (FLV) and so on.

(10) A non-streaming media encapsulation format streaming media format is an encapsulation technology of decoding and playing after encapsulating media data to be a media file and completely downing the media file. A typical file of the non-streaming media encapsulation format streaming media format includes an MP4 file, a windows media video (WMV) file, an advanced streaming format (ASF) file and so on.

It is necessary to point out that the MP4 file originally fails to play in a form of streaming media, but the technical effect of downing and playing at the same time can be acquired by online transcoding and subsequently delivering the transcoded streaming media to the player, or filling invalid binary data into the blank section of the incompletely downloaded MP4 file such as filling a blank section of an mdat box with invalid binary data when an ftyp box and an moov box are entirely downloaded. In the disclosure, encapsulation formats reject files of playing streaming media originally are defined to be non-streaming media formats.

First, a loading control device of a media player of an embodiment of the disclosure will be introduced. The loading control device of the media player provided by the embodiment of the disclosure can be various sorts of subscriber terminals such as a smart phone, a tablet, a laptop and so on. Exemplary applications of the device acting as the subscriber terminal will be illustrated as follows.

Figure 5:
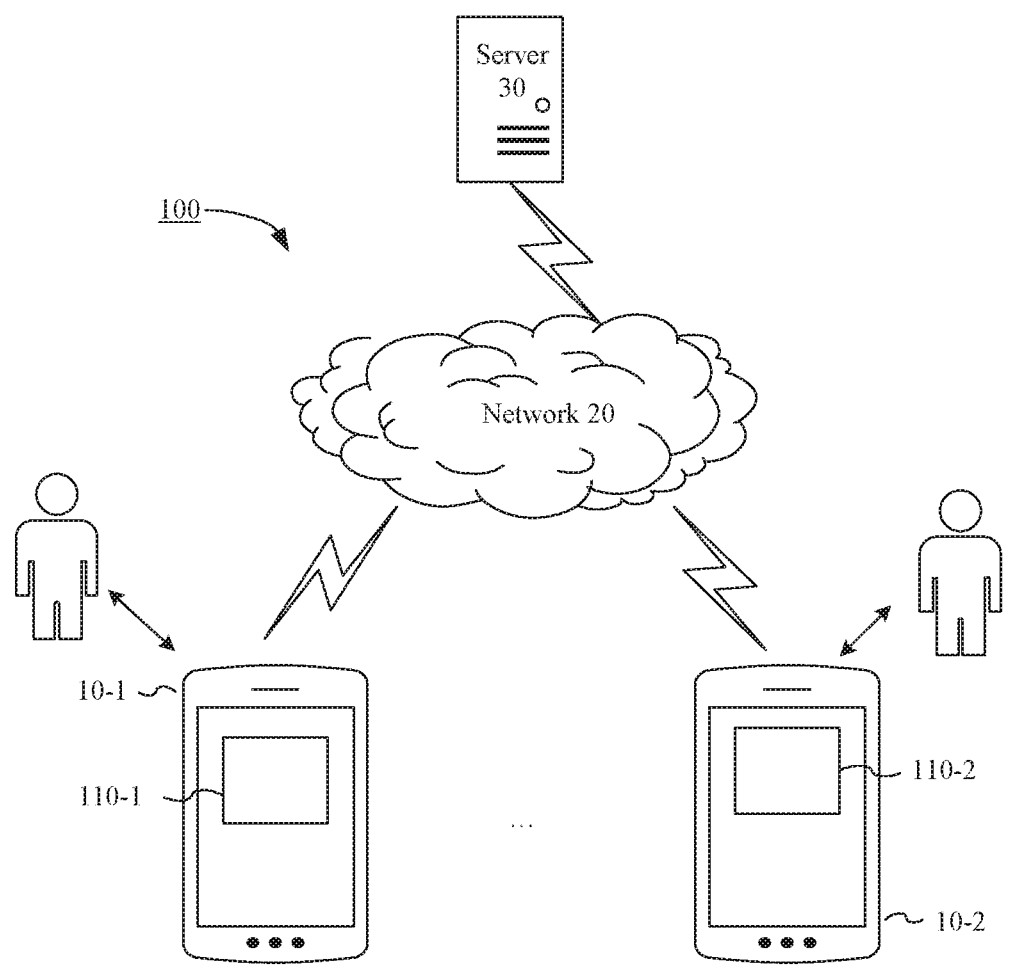
FIG. 5 is a schematic view of a framework of a loading control system of media playing provided by an embodiment of the disclosure.

Referring to FIG. 5, FIG. 5 is a schematic view of a framework of a loading control system 100 of media playing provided by an embodiment of the disclosure. In order to provide an exemplary application, a subscriber terminal 10 (exemplarily showing a subscriber terminal 10-1 and another subscriber terminal 10-2) is connected to a server 30 over a network 20. The network 20 can be a wide area network or a local area network, or a combination of both, which transmits data over a wireless link.

The subscriber terminal 10 plays a media file by a webpage embedded with a player, and shows contents through a graphical interface 110 (exemplarily showing a graphical interface 110-1 and another graphical interface 110-2). During the broadcast, the subscriber terminal 10 detects a time span corresponding to media data preloaded by the player; when the time span corresponding to the preloaded media data is less than a fixed time span, media data making the preloaded media data to satisfy the fixed time span are obtained from the server 30; the obtained media data are sent to a media element of a webpage by a media source extension interface for preloading.

The media-played loading control device of the embodiment of the disclosure will be illustrated as follows. The media-played loading control device can be provided as hardware, software or a combination of both.

Figure 6:
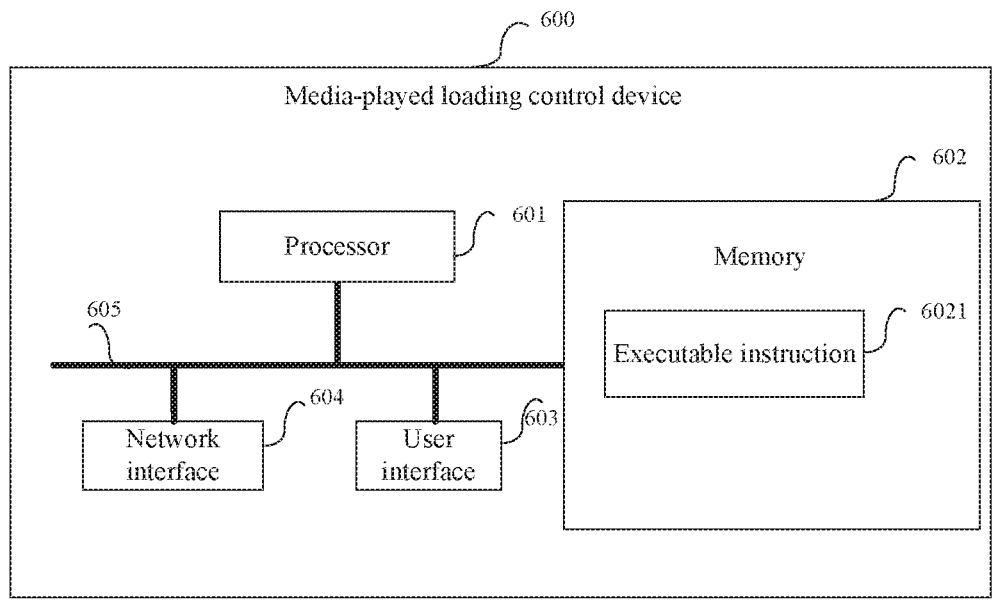
FIG. 6 is a hardware structural schematic view of a media-played loading control device provided by an embodiment of the disclosure.

The implement of the combination of software and hardware of the media-played loading control device of a webpage-based media file is illustrated. Referring to FIG. 6, FIG. 6 is an optional structural schematic view of a media-played loading control device provided by the embodiment of the disclosure. The hardware structure of the media-played loading control device of the embodiment of the disclosure will be introduced in detail as follows. Conceivably, FIG. 6 merely shows an exemplary structure rather than all the structures of the media-played loading control device, and a part of the structure or all the structures as shown in FIG. 6 can be performed according to the requirement.

A media-played loading control device 600 provided by an embodiment of the disclosure includes at least one processor 601, a memory 602, a user interface 603 and at least one network interface 604. Various components in the media-played loading control device 600 are coupled together by a bus system 605. Conceivably, the bus system 605 is utilized to connect and communicate the components. Besides the data bus, the bus system 605 further includes a power bus, a control bus and a status signal bus. But for the sake of clear illustration, all sorts of buses in FIG. 6 are marked as the bus system 605.

The user interface 603 can include a display, a keyboard, a mouse, a trackball, a click wheel, a key, a button, a touch panel or a touch screen.

Conceivably, the memory 602 can be a volatile memory or a nonvolatile memory, or both.

The memory 602 in the embodiment of the disclosure is configured for storing various sorts of data to support the operation of the media-played loading control device 600. Examples of the data include any executable instruction configured for running in the media-played loading control device 600, such as an executable instruction 6021, and programs of the media-played loading control method of the embodiment of the disclosure can be included in the executable instruction 6021.

The media-played loading control method disclosed by the embodiment of the disclosure can be used in the processor 601, or fulfilled by the processor 601. The processor 601 can be an integrated circuit chip with abilities to process signals. During the process, each of steps of the media-played loading control method can be fulfilled by an integrated logic circuit of in the form of hardware or commands in the form of software in the processor 601. The aforementioned processor 601 can be a communication processor, a digital signal processor (DSP) or other programmable logic devices, a discrete gate, a transistor logic device, or a discrete hardware component, etc. The processor 601 can implement or perform each of the methods, steps and logic diagrams in the embodiments of the disclosure. The communication processor can be a microprocessor or any other conventional processor. Combined with the steps of methods disclosed by embodiments of the disclosure, the result can be processed by hardware decoding processors or mixture of hardware and software in decoding processors. Software modules can be in the storage medium. The storage medium is in the memory 602. The processor 601 reads information in the memory 602, and accomplishes steps of the media-played loading control method provided by the embodiments of the disclosure with the aid of hardware.

The hardware achievement of the media-played loading control device will be illustrated below. The media-played loading control device in embodiments of the disclosure can be fulfilled by one or more application specific integrated circuit (ASIC), digital signal processing (DSP), programmable logic device (PLD), complex programmable logic device (CPLD), field-programmable gate array (FPGA) or other electrical elements, configured for performing the media-played loading control methods provided by embodiments of the disclosure.

The software achievement of the media-played loading control device will be illustrated below. The media-played loading control device in embodiments of the disclosure can be fulfilled by application programs or plug-ins, or a combination of both.

As an example, an application program can be a client specific for media-played loading control, or a client with an optical service of the function of the media-played loading control, which will be activated by installing a corresponding plug-in.

As an example, the plug-in can upgrade installation package for application programs and add the function of the media-played loading control in specific application programs; or an element in a webpage of media players employs the frontend language. The function of media-played loading control is achieved via directly read by the browser to perform in the webpage.

An exemplary implementation scenario of a media-played loading control method is described below.

As an embodiment of the loading control of media playing, the method can be realized by a player embedded in a webpage of a browser. A player plays a media file in a webpage of a browser. In the process of the player playing via the webpage of the browser, when the player detects that the time span corresponding to the preloaded media data is less than a fixed time span, the player acquires the media data enabling the preloaded media data to meet the fixed time span from a server, and then the player sends the acquired media data to media elements (video elements and/or Audio elements) of the browser through a media source expansion interface for preloading the media data.

As an embodiment of the loading control of media playing, the method can also be realized by a player embedded in a webpage of an APP. A browser kernel is embedded in the APP, and the player plays media files in the webpage loaded by the APP calling the browser kernel. Taking a WeChat client embedded with a browser kernel as an example, a user can load a playing page of a media file through a browser kernel embedded in the WeChat client. When the player detects that the time span corresponding to the preloaded media data is less than a fixed time span, the media data enabling the preloaded media data to meet the fixed time span will be obtained from a server; and then the acquired media data are sent to the media elements (video elements and/or Audio elements) of the WeChat client through a media source expansion interface for pre-loading the media data.

In the process of playing a media file by a player, a fixed time span is used for continuing the real-time playing point of the player to realize continuous playing of the media file. As for a playing point, the playing point can be the playing time reached by continuously playing the media file (i.e. automatically playing without the intervention by a user), such as a playing point playing from the $30^{th}$ minute to the $40^{th}$ minute. It is also possible to reach the playing time of the media file by means of jumping (i.e. a user clicks a progress bar via a cursor to realize page turn). For example, the original playing point is 20% of the playing progress, and the playing point after jumping is 30% of the playing progress, and the preloaded media data are the media data loaded after the playing point.

Next, taking the scenario that a player is embedded in a webpage, and the webpage implements a player instance by parsing and executing a JavaScript (JS) code of the player, and the player plays a media file by using a media element of the webpage as an example, a media-played loading control method provided by the embodiment of the disclosure is illustrated.

Figure 7:
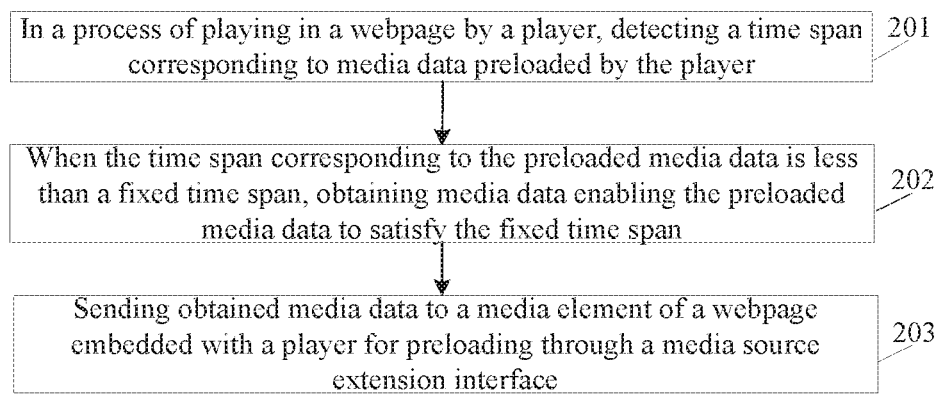
FIG. 7 is a first schematic flowchart of a media-played loading control method provided by an embodiment of the disclosure.

FIG. 7 shows an alternative flow diagram of a media-played loading control method provided by an embodiment of the disclosure. Referring to FIG. 7, the media-played loading control method provided by an embodiment of the disclosure involves step 201 to step 203, which are described respectively as below.

Step 201, in the process of a player playing through a webpage, the time span corresponding to the media data preloaded by the player is detected.

In one embodiment, the time span corresponding to the preloaded media data can be obtained by acquiring the time corresponding to a real-time playing point of a media file and the end time for playing corresponding to the loaded media data; and calculating the difference value between the end time for playing and the time corresponding to the playing point as the time span corresponding to the preloaded media data.

The time corresponding to the real-time playing point of the media file can be obtained by taking the start time for playing the media file as a time origin, acquiring the time corresponding to the video frame of the media file corresponding to the current playing point with reference to the time scale of the media time coordinate system; and taking the acquired time of the video frame as the time corresponding to the playing point.

The end time for playing corresponding to the loaded media data can be obtained by the following manner of acquiring the time corresponding to the last video frame of the currently preloaded media data, and taking the acquired time of the last video frame as the end time for playing corresponding to the currently preloaded media data.

Step 202, when the time span corresponding to the preloaded media data is less than a fixed time span, the media data which enables the preloaded media data to meet the fixed time span can be acquired.

The fixed time span is described and, in one embodiment, may be pre-configured.

Illustratively, the fixed time span is a configurable function provided by the player, and the fixed time span configured in the player can be obtained from the configuration information of the player; or the webpage side (the business side) carries out fixed time span configuration, and the player obtains the fixed time span configured on the webpage side from the configuration information of the webpage. In actual implementations, the fixed time span can be effective by one setup, or effective within a particular period of time, or effective for a particular media file (e.g., a particular type), or according to the setup of a login user.

In one embodiment, the fixed time span may also be adaptively obtained by a player.

Illustratively, the player determines that the time span adapted to network parameters of a webpage is a fixed time span.

Taking network parameters as the downlink network bandwidth for data transmission as an example, the adaptation of fixed time span is explained. The longer the fixed time span, the larger the amount of the media data corresponding to the fixed time span will be, and thus the amount of the media data requested to be obtained from a server after the playing point is updated will be larger, as well as the occupied downlink network bandwidth. That is, there is a positive correlation between the length of the fixed time span and the downlink network bandwidth. Therefore, in order to ensure the transmission performance of the network, the player can adapt the length of the fixed time span based on the current downlink network bandwidth and the positive correlation between the length of the fixed time span and the downlink network bandwidth.

Taking network parameters as transmission traffic for data transmission as an example, the adaptation of the fixed time span is explained. The longer the fixed time span, the larger the amount of the media data corresponding to the fixed time span will be, and thus the media data traffic/flow requested to be obtained by the player from a server after the playing point is updated will be accordingly larger. Therefore, in order to ensure the transmission performance of the network, the larger the current transmission traffic for media data transmission, the smaller the fixed time span needs to be set. That is, there is a negative correlation between the transmission traffic and the length of the fixed time span. The player can determine the length of the fixed time span based on the current transmission traffic for data transmission and the negative correlation between the transmission traffic and the length of the fixed time span.

Illustratively, a player determines that a time span adapted to the characteristic parameters of a webpage is a fixed time span.

Taking the feature parameters to be the number of playing windows in a webpage as an example, the adaptation of the fixed time span is explained. The greater the number of playing windows in the webpage, the greater the number of data interactions between the webpage and a server will be, and the loading pressure on the network will be likewise greater. Therefore, in order to ensure the network performance, when the number of playing windows in the webpage is large, the length of the fixed time span needs to be set short. That is, there is a negative correlation between the number of playing windows and the length of the fixed time span. The player may determine the length of the fixed time span based on the number of playing windows in the current webpage and the negative correlation between the number of playing windows and the length of the fixed time span.

When the characteristic parameter is the number of the playing windows in a webpage, the fixed time span can further be adapted based on the playing state of the playing windows, such as acquiring the number of the playing windows current in the playing state (i.e. controlling the load of the media playing), and determining the fixed time span based on the negative correlation between the number of the playing windows in the playing state and the fixed time span.

Next, the acquisition of media data will be illustrated. In a practical application, the media data may include video frames and audio frames. When a movie or a track is played, the player must be able to correctly parse the data stream, acquire the corresponding media data for certain time and ensure that the segment of the media data can be decoded independently. In one embodiment, the media data enabling the preloaded media data to meet a fixed time span can be acquired in the following manner of positioning a first key frame in the media file, positioning a second key frame in the media file, and extracting the media data between the first key frame and the second key frame from the media file. The decoding time of the first key frame is not later than the end time for playing the currently preloaded media data; the difference value between the decoding time of the second key frame and the start time for playing the preloaded media data is a fixed time span; that is, the media data with a fixed-time span are divided in units of key frames.

Next, positioning of the first key frame and the second key frame will be described. Taking media files to be MP4 files as an example, the player can position the first key frame and the second key frame according to the media information (information such as offset, size, decoding time of video/ audio frames) identified from the MP4 files. The last video frame of current video data preloaded by the player can be a normal frame or a key frame, and positioning the first key frame is respectively explained in the following two cases.

When the last video frame of the currently preloaded video data is a key frame, in order to avoid a frame skipping situation due to the lack of decoding data (i.e. a key frame), the decoding time of the first key frame is not later than the end time for playing the preloaded video data. If the last video frame of the currently preloaded video data is a key frame, the last video frame is taken as the first key frame. Therefore, the situation that redundant data to be requested can be reduced to the maximum extent so that the situation that the non-media playing service in a webpage is delayed due to the occupation of the webpage by connections and page traffic is avoided.

When the last video frame of the currently preloaded video data is a normal frame, in order to avoid a frame skipping situation due to the lack of decoding data (i.e. a key frame), the decoding time of the first key frame is not later than the end time for playing the preloaded video data. Therefore, the first key frame before the normal frame (i.e., the key frame closest to the normal frame before the normal frame) needs to be taken as the first key frame, namely taking the last key frame in the currently preloaded video data as a first key frame. In this way, it can be ensured that the last video frame of the currently preloaded video data has sufficient information for correct decoding without frame skipping due to the lack of decoding data (i.e. key frames).

Next, positioning the second key frame will be described. In one embodiment, the player may position the second key frame in MP4 files by determining the start time for playing the preloaded media data; since the media data with fixed time span are divided in units of key frames, the start time for playing is also the decoding time corresponding to the first key frame, and the key frame with the fixed time span as the difference value between the decoding time and the start time for playing MP4 files is taken as the second key frame; and if a video frame with the fixed time span as the difference value between the decoding time and the start time for playing MP4 files is a normal frame, in order to avoid frame skipping, the first key frame after the normal frame is taken as the second key frame.

Next, the scenario that the player identifies media information from media files is illustrated. In one embodiment, the player may identify media information from media files by requesting data in the media file with correspondingly set/given offset and size from a server (i.e. requesting data with a fixed size) according to the set offset and size, identifying the metadata in the moov box from the data returned by the server, and parsing the identified metadata to obtain media information used for describing the media data encapsulated in the mdat box of the media file.

The set size can be obtained according to the statistics of size of the ftyp box and that of the moov box of the existing media file so that the set size can cover the sum of the capacities of the flyp box and the moov box of a set proportion (e.g. all) of the media file, so that when the encapsulation structure of the media file is ftyp box, moov box and mdat box which are sequentially encapsulated, all the metadata encapsulated in the moov box can be obtained through one-time request, such that the occupation situation of connections during network transmission is saved, and the situation that the response from non-media playing service is delayed due to the fact that the connection cannot be used caused by the preoccupation of the connection is further avoided.

Taking the media file to be an MP4 file as an example, the metadata encapsulated in the moov box acquired by the player is binary data encapsulated in the moov box in the MP4 file. When the encapsulation structure of the MP4 file is sequentially encapsulated fytp box, moov box and mdat box, the set size can be obtained according to the statistics of size of the ftyp box and that of the moov box of the existing MP4 file. So that the set size is enabled to cover the sum of the binary data of the flyp box and the moov box of a set proportion (e.g. all) of the MP4 file, and it can be ensured that the complete binary data included in the moov box can be requested from the server at one time in most cases.

In one embodiment, among the binary data requested by the player from the server through the set offset and size, one segment of binary data starting from zero byte correspond to the ftyp box. The player obtains the size of the ftyp box by reading the box header, and learns the type and size of the next box by reading the header of the second box. When the type of the second box is the moov box, and the size of the returned binary data is not less than the sum of the size of the flyp box and the size of the moov box, it indicates that the binary data requested from the server by the set offset and size include the metadata/moov encapsulated in the moov box. When the type of the second box is the moov box and the size of the returned binary data is smaller than the sum of the size of the flyp box and the size of the moov box, it indicates that the binary data requested from the server by the set offset and size exclude the metadata encapsulated in the moov box. When the binary data requested by the player from the server through the set offset and size fail to contain the metadata in the complete moov box, the player needs to read the size of the box from the binary data returned from the server, calculate the offset and size of the moov box according to the header of the moov box, and carry the offset and size obtained by calculation in a network request to request the metadata from the server. The server reads binary data from the offset calculated in the media file according to the request and the read binary data conforms to the size obtained by calculation, and the data can be returned to the player.

Illustratively, the player reads the size of the box from the binary data returned from the server and calculates the offset and size of the moov box according to the header of the moov box, involving the following two cases.

Case 1) when the type of the box read from the remaining binary data (i.e., data other than the binary data of the flyp box in the returned binary data) is the moov box, and the size of the remaining binary data is less than the size of the moov box, the difference value between the size of the moov box and the size of the remaining binary data is calculated as the new size of the second request; the sum of the offset and the size in the first request acts as the new offset, the server is requested for binary data for the second time.

Case 2) when the type of the box read from the remaining binary data is the mdat box, the sum of the size of the mdat box and the size of the flyp box is calculated as a new offset of the second request, and the binary data is requested from the server for the second time with a set size (which may be an empirical value capable of covering the size of the moov box).

Taking the media file to be an MP4 file as an example, the binary data requested by the player from the server through the set offset and size do not contain the complete binary data of the moov box, and at the moment, the player needs to read the type and size of the box from the binary data returned by the server to determine the offset and size of the moov box in the MP4 file.

The starting byte of the binary data of the MP4 file always corresponds to the flyp box. The binary data of the fytp box can be identified from the returned binary data, and the length of the binary data of the fytp box can be known according to the header of the flyp box, so that the binary data of the next box are read from the remaining binary data according to the standard length of the header. The box type represented by the header includes the following cases.

1) When the type of the box read from the remaining binary data (i.e., the data other than the binary data of the fytp box in the returned binary data) is moov box, and the size of the remaining binary data is not less than the size of the moov box, according to the determined offset and size, moov data in the MP4 file which start from the offset of the moov box in the MP4 file and conform to the size of the moov box in the MP4 file can be acquired from the server.

2) When the type of the box read from the remaining binary data is moov box and the size of the remaining binary data is smaller than the size of the moov box, the difference value between the size of the moov box and the size of the remaining binary data is calculated as a new size of the second request, and the binary data from the server is requested for the second time by using the sum of the offset and size in the first request as the new offset of the second request.

3) When the type of the box read from the remaining binary data is mdat box, the sum of the size of the mdat box and the size of the flyp box is calculated as a new offset of the second request, and the binary data can be requested from the server for the second time based on the set size.

Therefore, regardless of the encapsulation structure of the media file, namely regardless of the encapsulation sequence of the flyp box, the moov box and the mdat box in the media file, it can be assured that the metadata in the moov box can be obtained from the server by the player within at most two requests, and the metadata acquisition efficiency is improved.

For example, for the MP4 file, among the binary data returned by the server, a segment of the binary data starting from zero byte correspond to the flyp box according to the encapsulation standard of the MP4 file. The size (namely length) of the ftyp box and the size of the complete MP4 file can be read from the header of the flyp box according to the encapsulation standard of the header of the box; it is assumed that the size of the flyp box is a (in bytes), the header information of the subsequent box is read starting from a+1 to obtain the type and size of the subsequent box. If the flyp box is followed by the moov box obtained by reading, and the size of the remaining binary data (set size-the size of the flyp box) is larger than the size of the moov box, it depicts the complete binary data of the moov box have been retrieved. The metadata in the moov box can be extracted from the remaining binary data according to the offset and size of the moov box.

After the player obtains the metadata encapsulated in the moov box from the server, the nested structure of the sub-boxes in the moov box is parsed and the binary data in each sub-box can be read out according to the nested structure of the sub-boxes; and the media information of the media data characterized by each sub-box is parsed from the read binary data. In practice, the media information may include information such as offset, size, decoding time and the like of video frames and/or audio frames in the media file.

Taking the media file to be an MP4 file as an example, a metadata box is the moov box. Referring to FIG. 2, it can be seen that an mvhd box and a track box are encapsulated in the moov box; information such as creation time, modification time, time measurement scale, playable time span, default volume and the like of the MP4 file can be obtained by parsing the binary data of the mvhd box; and the moov box includes numerous track boxes, which record description information specific to each media track. For example, for a video track (video track box), sub-boxes are nested in multiple layers in the video track box, and the video frame information and corresponding picture information of an MP4 file are obtained by parsing corresponding binary data based on a nested structure of the video track box.

In one embodiment, the player can parse the acquired metadata to obtain media information by: sequentially parsing the binary data corresponding to the standard length of the box header in the binary data of the moov box to obtain the box type of the sub-box in the moov box and the length of the box data of the sub-box; and calling a parser whose type is corresponding to the box type of the sub-box to sequentially parse the binary data corresponding to the length of the box data in unparsed data to obtain media information represented by the box data.

Under the condition of numerous sub-boxes nested in the moov box, the offset of binary data read by the player for each time is the sum of the lengths of the sub-boxes which have been identified, and the read lengths of the binary data conform to the standard length of the box header so that the type and length of the sub-box currently processed can be parsed.

For example, during the first time, it starts to read the binary data from zero byte of the binary data of the moov box, and the length of the read binary data conforms to the standard length of the box header, which can parse the type and the length of the first sub-box; during the second time, the binary data start to be read by taking the length of the first-read sub-box as an offset, and the length of the read binary data conforms to the standard length of the box header, so that the type and the length of the second sub-box can be parsed.

It can prevent a situation of backspace caused by over-reading and a situation of reading twice because of missing read, which can ensure the efficiency and accuracy in parsing.

In one embodiment, a typical box type nested in the moov box is pre-labeled to indicate whether the box is directly used to encapsulate binary data or further encapsulated with a box therein. For example, the mvhd box, the audio track box, and the video track box shown in FIG. 2 are labeled to be further encapsulated with a box therein; the stts box and the stsd box shown in FIG. 2 are labeled as to directly encapsulate binary data.

Regarding the box types labeled as directly encapsulating the binary data, parsers respectively corresponding to the box types are disposed, and the parser is used for parsing the represented media information according to the binary data. Comparing the box type of the sub-box with the pre-labeled box type involves the following two cases.

Case 1) when it is determined by comparison that the box type of the sub-box is pre-labeled and it is pre-labeled as directly encapsulating binary data, a parser corresponding to the box type of the sub-box is called, and the box data in the sub-box are parsed by the parser to obtain media information represented by the box data.

Case 2) when it is determined by comparison that the box type of the sub-box is pre-labeled and it is pre-labeled as continuing to encapsulate the box, according to the standard length of the box header in the media file, the binary data corresponding to the sub-box can be recursively parsed until the box type of the box encapsulated in the sub-box is parsed to be pre-labeled and it is pre-labeled as directly encapsulating the binary data. A parser corresponding to the box type of the box encapsulated in the sub-box is called, and the binary data can be parsed byte by byte; the length of the parsed binary data corresponds to the length of the box data of the box encapsulated in the sub-box so as to obtain media information represented by the box data of the box encapsulated in the sub-box.

In one embodiment, a method for recording media information in a process of parsing the moov box is described. When the binary data corresponding to a standard length of a box header in moov box are sequentially parsed to obtain a box type of a sub-box in the moov box, an object can be created according to a nested relationship between the sub-box and the box to which the sub-box affiliates and a nested relationship between the sub-box and the box encapsulated therein. When a box type of a sub-box is pre-labeled for directly encapsulating the binary data, an array including media information is stored in an object created correspondingly to the sub-box; the stored media information is represented by the box data of the sub-box.

For example, in FIG. 2, when the type of the parsed sub-box is stts box, since the stts box is pre-labeled as directly encapsulating the binary data, an array including media information, which is time span information represented by the box data of the stts box, is stored in an object created correspondingly to the stts box.

In one embodiment, it can be learnt from the manner of recording a nested relationship between sub-boxes in the process of parsing the moov box that when the binary data corresponding to a standard length of a box header in moov box are sequentially parsed and a box type of a sub-box in the moov box is obtained, the parsed sub-box is recorded in the called parser if the box type is pre-labeled as directly encapsulating the binary data; and an instance of the recorded sub-box is set into the attribute of the sub-box, which is included in a box to which the sub-box affiliates for describing a nested relationship between the sub-box and the box to which the sub-box affiliates.

For example, in FIG. 2, when the type of the parsed sub-box is stsd box, since the stsd box is pre-labeled for directly encapsulating the binary data, the stsd box is recorded in the parser corresponding to the stsd box, and an instance of the stsd box is set into the sub-box attribute of the stbl box, and so on. Finally sub-boxes nested in the stbl box, such as the stsd box, the stts box, the stsc box and the like, are recorded in the sub-box attribute of the stsd box.

In one embodiment, when it is determined by comparison that the box type of the sub-box is not pre-labeled, or is pre-labeled to directly encapsulate the binary data but fail to call a parser of a corresponding type, the binary data corresponding to the parsed sub-box can be ignored, and the process skips to the part corresponding to the next sub-box in the binary data to continue parse according to the length of the sub-box.

In practical application, a self-defined box type would appear in a media file, so the overall parsing progress of the moov box will not be affected by the skipping mode. Meanwhile, when the box type of the moov box changes, compatible parsing of the latest moov box can be quickly realized by adding, deleting and modifying a parser of a corresponding type through setting a parser. The method has the characteristics of flexibility and rapidness in upgrading.

Based on the above description of the identification of media information, it will be described in detail that the player acquires media data between the first key frame and the second key frame according to the identified media information. After the player positions the first key frame and the second key frame, in one embodiment, media data between the first key frame and the second key frame can be extracted from the media file as follows: determining the offset and size of the target interval/range based on the offset and size of the video frame between the first key frame and the second key frame in the media file and the offset and size of the audio frame aligned with the video frame in the media file; the target interval includes the video frame and the audio frame; according to the determined offset and size, the offset and size of a target interval (an interval formed by the minimum offset and the maximum size) containing the video frame and the audio frame can be determined; and based on the offset and size of the target interval, corresponding media data can be extracted from the mdat box of the media file.

Here, the alignment of audio frames and video frames in embodiments of the disclosure will be described, which includes positioning time-synchronized audio frames in video frames according to the starting time and time span of the media data on the basis of video frames to ensure that the decoding starting time of the first audio frame in the media data is not later than the decoding starting time of the video frame, and the decoding time of the last audio frame is not earlier than the end time of decoding video frame. The situation of pictures without sound can be prevented when a media file (such as a video) is played, and the extra retrieved audio frames can be decoded and used when subsequently corresponding video frames are played.

The determination of the offset and size of the target interval is described, which includes positioning the video frame in the moov box by the offset and size of the video frame between the first key frame and the second key frame of the two key frames in the media file, positioning the audio frame in the moov box by the offset and size of the audio frame aligned with the video frame in the media file, and taking an interval formed by an upper limit and a lower limit of the positions as a target interval (i.e. an interval formed by the minimum offset and the maximum size); and the offset and the size corresponding to the upper limit of the positions are the offset and size corresponding to the upper limit of the target interval, and the offset and the size corresponding to the lower limit of the positions are the offset and size corresponding to the lower limit of the target interval. In practical application, the target interval is the smallest interval in which video frames and audio frames are stored in the mdat box of the media file with target resolution. For example, the offset of the video frame between the first key frame and the second key frame at the position of the media file with target resolution corresponds to an interval of [a, b] (the address is in ascending order), and the offset of the audio frame at the position of the media file with target resolution corresponds to an interval of [c, d] (the address is in ascending order), and then the interval formed by the upper limit and the lower limit of the positions is [min (a, c), max (b, d)]. Therefore, the player sends a network request carrying the offset and size of the target interval to the server to request the media data of the target interval. The server extracts the media data in the media file based on the offset and size of the target interval and returns the media data of the target interval at one time without second acquisition, which can reduce the request times of the player and improve the processing efficiency.

Step 203, the acquired media data are sent to media elements of a webpage with an embedded player for preloading through a media source expansion interface.

In one embodiment, when the played media file is a file in a streaming media format supporting to play streaming media, it can send the acquired media data to media elements of a webpage with an embedded player for preloading in the following manner.

The acquired media data are added into a media source object in a Media Source Extensions (MSE) interface; the MSE is called to create a virtual address corresponding to the media source object; and the virtual address is delivered to a media element (video element, audio element); the virtual address is used for supporting media elements to preload with the media source object as data source.

In one embodiment, the media file played by the player adopts a non-streaming media format such as an MP4/MKV/ WMV/ASF encapsulation format. The player needs to construct the acquired media data meeting the fixed time span into a fragmented media file, and then adds the fragmented media file to a media source object in the MSE; the MSE is called to create a virtual address corresponding to the media source object. A virtual address is delivered to a media element (video element, audio element); the virtual address is configured for supporting media elements to preload with the media source object as data source.

Here, the process that the player constructs a fragmented media file based on the acquired media data making the preloaded media data meet a fixed time span is illustrated. In one embodiment, the player may construct a fragmented media file in the following manner. The player calculates the metadata of the level of fragmented media file based on the identified media information, and fills the calculated metadata and the obtained media data based on the encapsulation format of the fragmented media file to obtain the corresponding fragmented media file.

Figure 8:
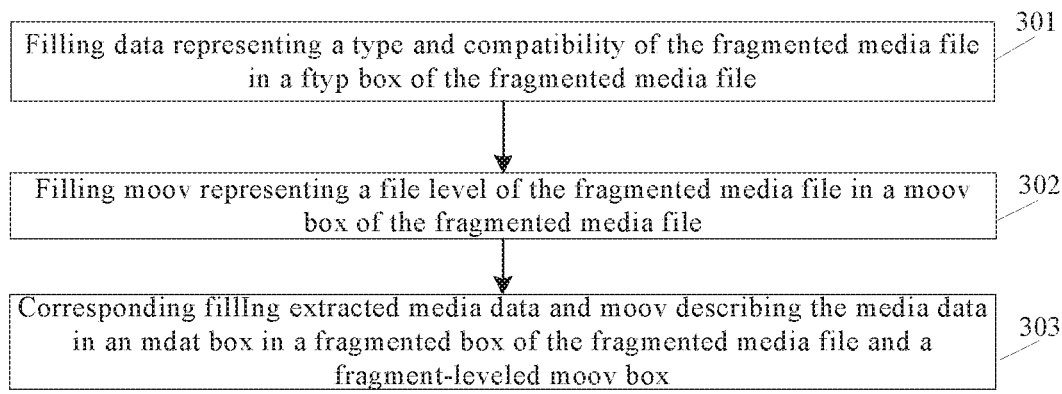
FIG. 8 is a schematic flowchart of encapsulating a fragmented media file provided by an embodiment of the disclosure.

In one embodiment of the disclosure, referring to FIG. 8, FIG. 8 is an optional flow diagram of encapsulating a fragmented media file provided by an example of the disclosure, which will be described in conjunction with the steps shown in FIG. 8.

Step 301, data representing the type and compatibility of the fragmented media file are filled into the ffyp box of the fragmented media file.

For example, taking the FMP4 file encapsulated to form the encapsulation structure shown in FIG. 4 as an example, the type and length (representing the overall length of the ffyp box) of the box are filled in the ffyp box of the FMP4 file, i.e., the header of the ffyp box. The data portion of the ffyp box is filled to generate data (binary data) representing the file type as FMP4 and the compatible protocol.

Step 302, the metadata representing the file level of the fragmented media file is filled into the moov box of the fragmented media file.

In one embodiment, the metadata describing the media data required to fill the nested structure are calculated based on the media data to be filled into the encapsulation structure of the fragmented media file and based on the nested structure of the moov boxes in the fragmented media file.

Still taking FIG. 4 as an example, the metadata representing the file level of the FMP4 file are calculated and filled into a metadata box (i.e., moov box) of the FMP4, and three boxes of mvhd, track and movie extend (mvex) are nested in the moov box.

The metadata encapsulated in the mvhd box are used for representing media information related to the playing of the fragmented media file, including a position, a time length, a creation time, a modification time and the like; and the sub-boxes nested in the track box represent references and descriptions of corresponding tracks in the media data; for example, a track box is nested with a box (denoted as tkhd box) describing characteristics and overall information (such as time span, width and length) of the track, a box (denoted as mdia box) recording media information (such as media type and sample information) of the track.

Step 303, the extracted media data, and metadata describing the media data are correspondingly filled into the mdat box in a fragment box of the fragmented media file and the moov box with fragment levels.

In one embodiment, one or more fragments may be encapsulated in a fragmented media file, and media data to be filled may be filled into one or more fragmented mdat boxes (i.e., mdat boxes) of the fragmented media file. Each fragment has a fragment-leveled moov box (labeled as moof box) encapsulated therein; the filled metadata are used to describe the media data filled in the fragment so that the fragments are enabled to be decoded independently.

Referring to FIG. 4, taking filling the media data to be filled into two fragments of the encapsulation structure of the FMP4 file as an example, the media data are filled into each fragment; and the metadata that need to be filled into the moov box (i.e., moof box) of the fragment level of the corresponding fragment are calculated and correspondingly filled into a sub-box nested in the moof box; the header of the moof box is called the moof box, and the filled binary data are used for indicating the type of the box to be "moof box" and the length of the moof box.

In one embodiment of filling data into corresponding boxes from step 301 to step 303, when a filling operation is performed, a writing operation function of class is called to complete writing and merging binary data in a memory buffer of the sub-box, and an instance of the class is returned for merging the sub-box with a sub-box having a nested relationship.

It is an example of filling data for establishing a class MP4 for realizing an encapsulation function, and a static method of encapsulating each sub-box in the fragmented media file into a class stream; a class stream for realizing a binary data operation function is established; each class stream is provided with a memory buffer for storing binary data to be filled; multi-byte decimal data to be filled are converted into binary data by the static method provided by Stream; binary data to be filled into a sub-box are combined and filled in a memory buffer by the writing operation function provided by an instance of class stream. And the static method provided by Stream returns a new Stream instance to merge the current sub-box with other sub-boxes having nested relationships.

Figure 9:
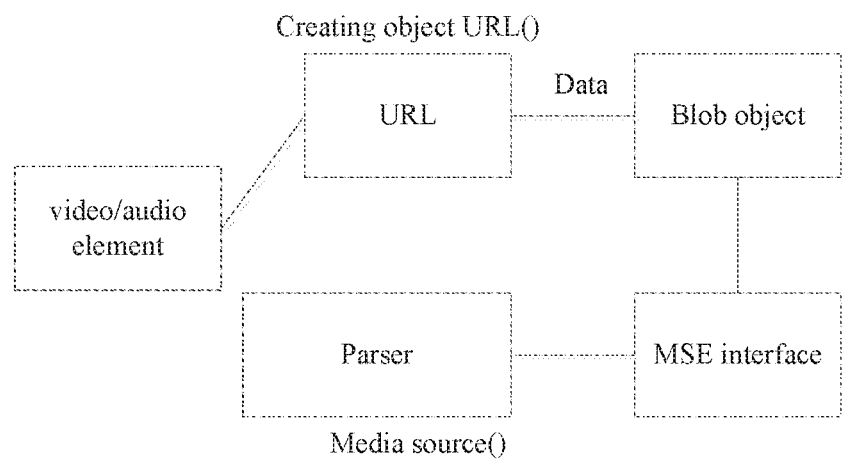
FIG. 9 is a schematic view of playing a fragmented media file over a media source extension interface of a webpage by a player provided by an embodiment of the disclosure.

Referring to FIG. 9, FIG. 9 is an optional schematic diagram of a player sends a fragmented media file to a media element through a media source expansion interface of a webpage for pre-loading provided by the embodiment of the disclosure. When the player receives a playing event of the media file in a playing window (the playing window corresponding to the player) in the webpage, an MSE creates a media source object by executing a MediaSource method, and executes an addSourceBuffer method encapsulated in a media source expansion interface to create a cache of a MediaSource object, namely a SourceBuffer object; one MediaSource object has one or more SourceBuffer objects, and each SourceBuffer object can be used for corresponding to a playing window in a webpage, which can be configured for receiving a fragmented media file to be played in the window. In the playing process of the media file, a parser in the player continuously constructs a new fragmented media file by parsing newly acquired media data, and adds the fragmented media file to a SourceBuffer object of the same MediaSource object by executing an appendBuffer method of the SourceBuffer object to realize preloading the media data in the media file.

After the player adds the constructed fragmented media file to the media source object in the media source expansion interface, the media source expansion interface is called to create a virtual address corresponding to the media source object; the virtual address is used for providing the media element to load and play data by taking the media source object as the data source. For example, the player executes a createObjectURL method encapsulated in a media source extension interface to create a virtual address corresponding to the media source object, i.e., a virtual Uniform Resource Locator (URL), and a fragmented media file of a Blob type is encapsulated therein. In addition, the player sets the MediaSource object as the source (src) attribute of the virtual URL, i.e., binding the virtual URL to a media element in the webpage, such as a video/an audio element. The process is also referred to as associating the media source object with the media element in the webpage.

Figure 10:
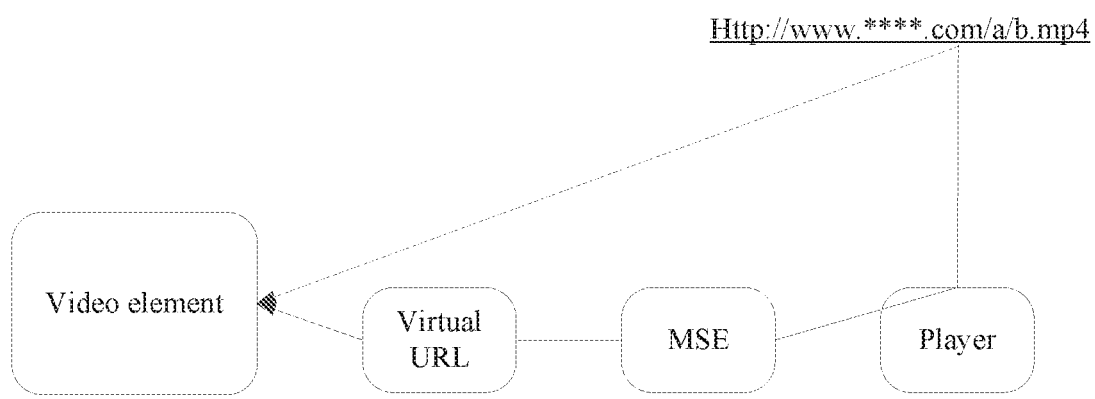
FIG. 10 is a schematic view of converting an MP4 file to an FMP4 file and playing by a media source extension interface provided by an embodiment of the disclosure.

FIG. 10 is a flow diagram of a player sends a fragmented media file to a media element through a media source expansion interface provided by the embodiment of the disclosure. Referring to FIG. 10, the player acquires media data meeting the fixed time span based on the real address (http://www.toutiao.com/a/b.mp4 shown in the figure) of the media file, then constructs a fragmented media file based on the acquired media data, i.e., converting it into a media file in a fragmented MP4 format, and then adds the fragmented media file to a media source object of the MSE (for example, implemented in a class file object (Blob) manner). The MSE creates a virtual URL corresponding to the media source object and transmits the virtual URL to the video element, so that the video element acquires a corresponding media source object to realize preloading the media data meeting the fixed time span.

Figure 11:
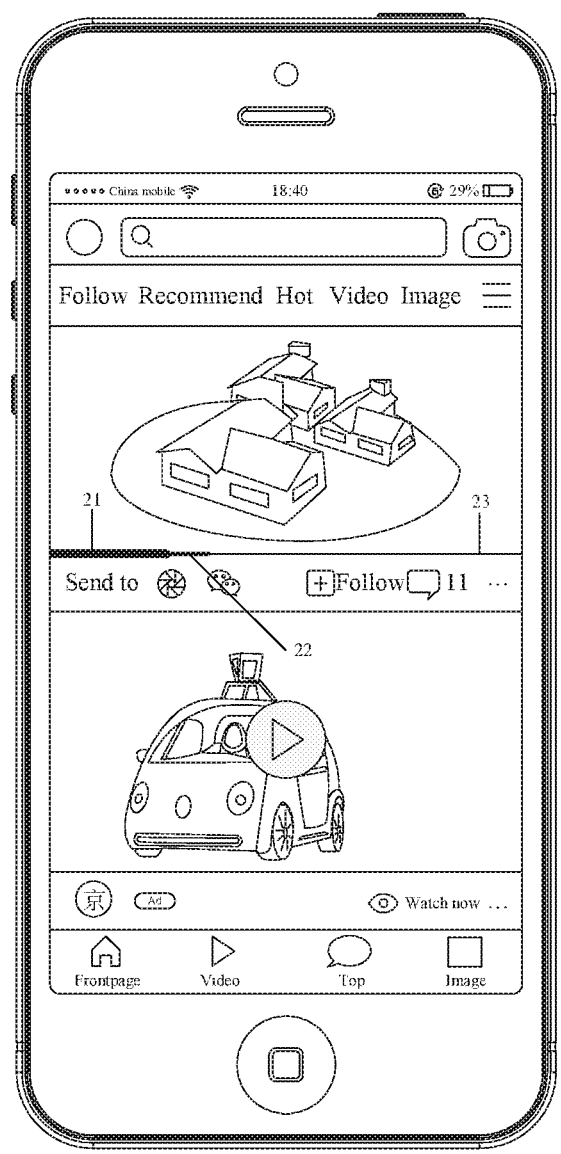
FIG. 11 is a schematic view of distinguishing displaying a fragment corresponding to a preloaded media data and a fragment corresponding to a non-preloaded media data provided by an embodiment of the disclosure.

In one embodiment, in order to display the preloaded media data, the fragments corresponding to preloaded media data and the fragments corresponding to non-preloaded media data may be differentially displayed in a playing window corresponding to the media file in the webpage. For example, fragments corresponding to preloaded media data and fragments corresponding to non-preloaded media data are displayed in different colors. FIG. 11 is a schematic diagram of differentially displayed fragments corresponding to preloaded media data and fragments corresponding to non-preloaded media data provided by the embodiment of the disclosure. In FIG. 11, the played media data, the preloaded media data and the non-preloaded media data are distinguished by using fragment indication lines with different thicknesses. The played fragments of the media data in the current playing window are shown by reference numeral 21 in FIG. 11. Reference numeral 22 is a preloaded media data fragment in the current playing window, and reference numeral 23 is a media data fragment that is not preloaded in the current playing window; since the time span corresponding to the preloaded media data is a fixed time span, i.e. in the current playing window, the fragment length shown by reference numeral 22 is always fixed. Therefore, when a user only wants to browse a media file, such as browsing the media file by manually switching the playing point, the player will preload the fixed portion of preloaded media data instead of all the media data which are not played based on the current playing point; so that the traffic consumption of the user is reduced while the watching experience of the user is guaranteed.

Figure 12:
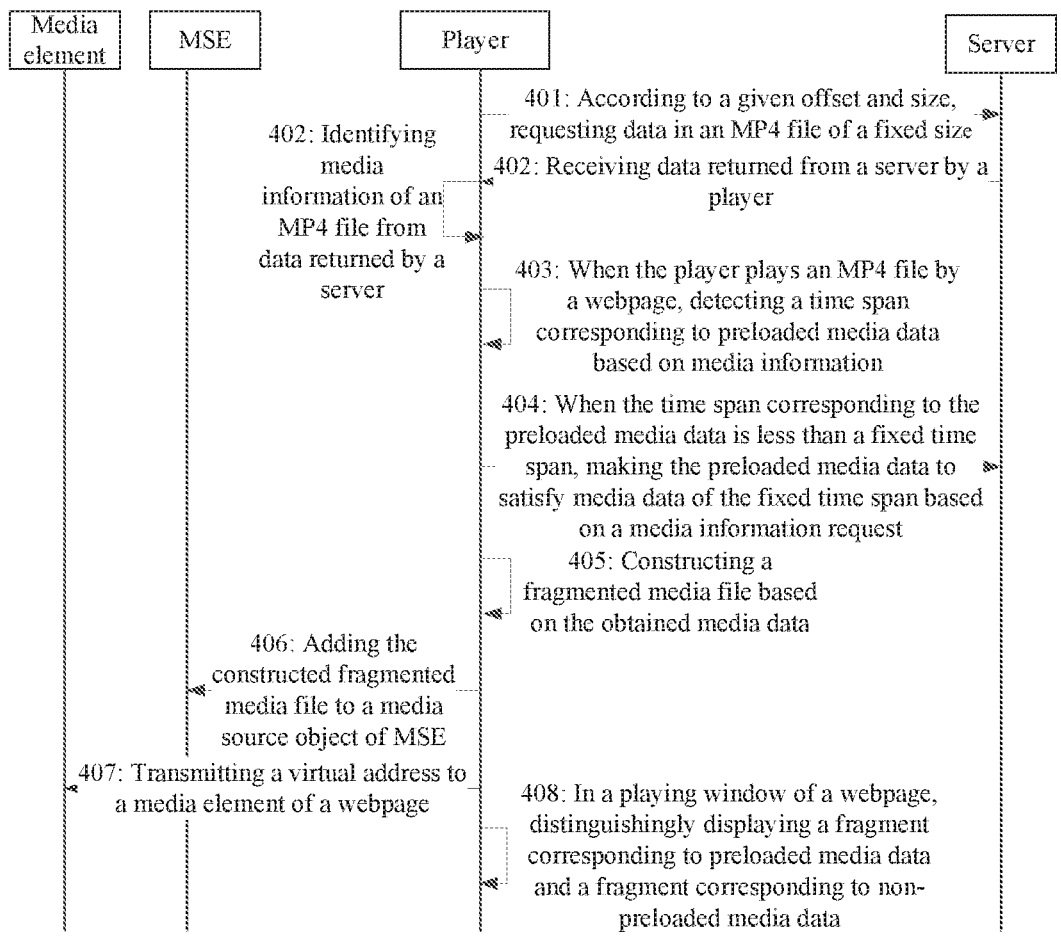
FIG. 12 is a second schematic flowchart of a media-played loading control method provided by an embodiment of the disclosure.

Next, taking the player embedded in a webpage and the player playing the MP4 file using the HTML5 media element of the webpage as an example, the media-played loading control method of the embodiment of the disclosure is explained. FIG. 12 illustrates an alternative flow diagram of a media-played loading control method provided by an embodiment of the disclosure. Referring to FIG. 12, the media-played loading control method provided by an embodiment of the disclosure includes the following steps.

Step 401, the player requests the data in the MP4 file with a fixed size from the server according to a set offset and size.

The player acquires binary data starting from zero byte and conforming to the set size in the MP4 file by sending a data request carrying the set offset and size to the server. In one embodiment, the box encapsulation structure adopted by the media file includes sequentially encapsulated flyp box, moov box and mdat box, and the encapsulation structure preferable for the MP4 file includes sequentially encapsulated fytp box, moov box and mdat box. The set size can be obtained according to the statistics of sizes of the flyp box and the moov box of the existing MP4 file, so that the set size can cover the sum of the flyp box and the moov box of a set proportion (such as all) of the MP4 file, and it can be guaranteed that complete moov box binary data can be requested from the server at one time.

Step 402, the player receives the data returned by the server, and identifies the media information of the MP4 file from the data returned by the server.

The media information of the MP4 file includes information such as the offset, size, decoding time of video/audio frames in the MP4 file.

In one embodiment, the player can identify the media information of the MP4 file in the following manner. The binary data of the fytp box can be identified from the data returned by the server, and the type and size of the box are read from the remaining binary data; when the type of the read box is moov box and the size of the remaining binary data is not less than the size of the moov box, the media information is parsed from the remaining binary data. Here, the initial section of binary data returned by the server must correspond to the flyp box. According to the encapsulation specification of the ftyp box, the size (i.e. length) of the flyp box and the size of the complete MP4 file can be read; for example, the size of the flyp box is a (in bytes), and the header information of a subsequent box is read starting from a+1 to obtain the type and size of the box. If it is moov box, and (setting size—the size of flyp box) is larger than the size of the moov box, it is indicated that the complete binary data of the moov box are retrieved, and the binary data can be parsed according to the encapsulation structure to restore the media information.

In one embodiment, when the binary data returned by the server fail to include complete moov data, the size of the box can be read from the acquired binary data, and the offset and size of the moov box in the MP4 file are determined. According to the determined offset and size, when the type of the box read from the remaining binary data is moov box and the size of the remaining binary data is not smaller than the size of the moov box, the moov data which start from the offset of the moov box in the MP4 file and conform to the size of the moov box in the MP4 file in the MP4 file can be obtained from the server; when the type of the box read from the remaining binary data is moov box and the size of the remaining binary data is smaller than the size of the moov box, the difference value between the size of the moov box and the size of the remaining binary data is calculated as a new size of the second request, and the binary data can be requested from the server for the second time with the sum of the offset and size requested for the first time as a new offset.

In practical application, the encapsulation structure of the MP4 file is sequentially encapsulated fytp box, mdat box and moov box. When the type of the box read from the remaining binary data is mdat box, the sum of the size of the mdat box and the size of the moov box is calculated as a new offset of the second request, and the binary data can be requested from the server for the second time with a set size.

Step 403, in the process that the player plays an MP4 file by a webpage, the time span corresponding to the preloaded media data is detected based on the media information.

The media data herein include video frames and audio frames.

In one embodiment, the time span corresponding to the preloaded media data can be obtained by steps of: acquiring the time corresponding to the real-time playing point of the media file and the playing end time corresponding to the loaded media data; and calculating the difference value between the playing end time and the time corresponding to the playing point as the time span corresponding to the preloaded media data.

Step 404, when the time span corresponding to the preloaded media data is less than the fixed time span, the media data enabling the preloaded media data to meet the fixed time span can be requested from the server based on the media information.

In one embodiment, the fixed time span has attributes configured for business parties (different video platforms). A relatively long fixed time span may be configured if the business party focuses on user experience. A relatively short fixed time span may be configured if the business party focuses on reducing user traffic consumption.

In one embodiment, the media data with fixed time span can be divided by taking a key frame as a unit, and the media data which enable the preloaded media data to meet the fixed time span can be acquired in the following manner of positioning a first key frame in the MP4 file according to the identified media information; and positioning a second key frame in the MP4 file. The decoding time of the first key frame is not later than the playing end time of the preloaded media data; the difference value between the decoding time of the second key frame and the playing start time of the preloaded media data is a fixed time span; and the media data between the first key frame and the second key frame can be extracted from the MP4 file.

Step 405, a fragmented media file is constructed based on the acquired media data.

In one embodiment, the fragmented media file may be constructed by determining the metadata describing the acquired media data based on the identified media information, and encapsulating the determined metadata and the acquired media data according to the box structure of the fragmented media file to obtain the corresponding fragmented media file.

Step 406, the constructed fragmented media file is added to the media source object in the MSE.

Step 407, a virtual address is delivered to media elements of a webpage.

The virtual address is used for providing video elements to preload by taking the media source object as the data source.

Step 408, in a playing window of a webpage, fragments corresponding to preloaded media data and fragments corresponding to non-preloaded media data are displayed differentially.

According to the embodiment disclosed by the disclosure, the following beneficial effects are achieved.

1. The media data preloaded by the player always are a fixed time span, which can realize to control the loading of media data and avoid mass traffic consumption and unnecessary occupation of the connection.

2. The player can convert the media data in the media files in non-streaming media format into fragmented media files, and send the fragmented media files to media elements of a webpage for decoding and playing through a media source expansion interface of the webpage, so that the player plays the media files in non-streaming media format by the webpage where embedded in, and the limitation that the non-streaming media encapsulation format files can only be independently played after being completely downloaded is overcome.

3. The video element and the audio element of the webpage are based on a virtual address, so that the real address of the MP4 file is protected.

4. The fragments corresponding to the preloaded media data and the fragments corresponding to the media data which is not preloaded are differentially displayed to realize the prompt for displaying the media data at different stages in the process of playing the MP4 file.

Figure 13:
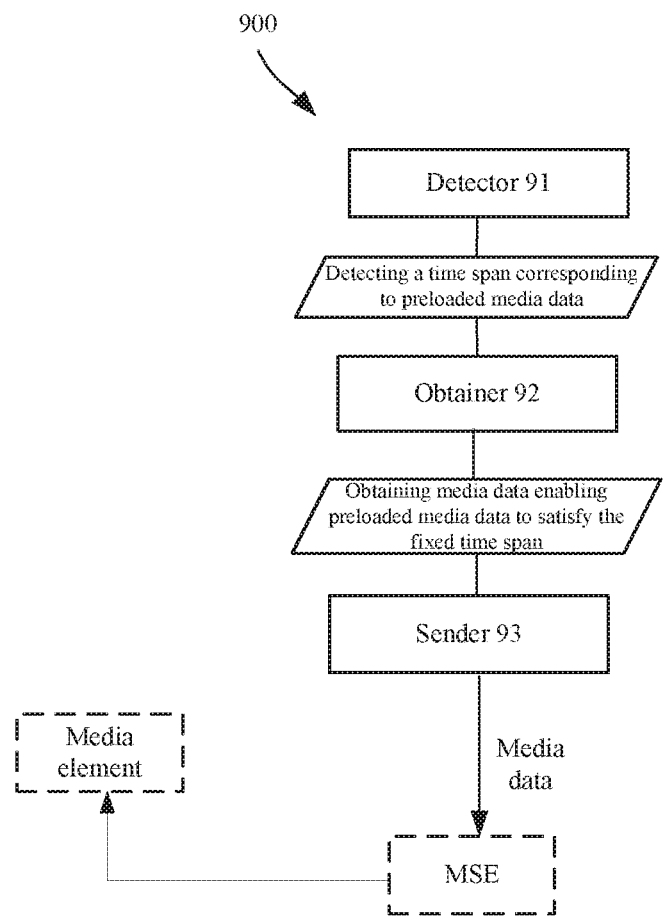
FIG. 13 is a structural schematic view of a media-played loading control device provided by an embodiment of the disclosure.

The media-played loading control device is continued to be described next. In actual implementation, the media-played loading control device can also adopt a software implementation mode as a software implementation example of the media-played loading control device. FIG. 13 is a structural schematic diagram of the media-played loading control device provided by the embodiment of the disclosure. Referring to FIG. 13, the media-played loading control device 900 includes a detecting unit 91 disposed to detect a time span corresponding to media data preloaded by the player in a playing process of a player built-in a webpage, an obtainer 92 disposed to obtain media data rendering the preloaded media data to satisfy a fixed time span when the time span corresponding to preloaded media data is less than the fixed time span, and a sender 93 disposed to send obtained media data to a media element of the webpage for preloading via a media source extension interface.

In one embodiment, the media-played loading control device can further include a first determiner disposed to determine a time span adaptive to a network parameter of the webpage to be the fixed time span.

In one embodiment, the first determiner is further disposed to determine a media data size able to be preloaded by the player based on a positive correlation of a download network bandwidth of transmitting media data and a preloaded media data size.

A playing time span of the media data size able to be preloaded is determined to be the fixed time span.

In one embodiment, it further includes a second determiner disposed to determine a time span adaptive to a characteristic parameter of the webpage to be the fixed time span.

In one embodiment, the second determiner is further disposed to obtain a quantity of windows playing in the webpage.

The fixed time span is determined based on a negative correlation of the quantity of windows playing in the webpage and the fixed time span.

In one embodiment, the obtainer is further disposed to position a first key frame in a media file; decoding time of the first key frame is no later than an end time of playing the preloaded media data.

A second key frame is positioned in the media file; a difference value of decoding time of the second key frame and a start time of playing the preloaded media data is the fixed time span.

Media data between the first key frame and the second key frame are extracted from the media file.

In one embodiment, the obtainer is further disposed to determine an offset and a size of a target range based on an offset and a size of video frames between the first key frame and the second key frame in the media file, and an offset and a size of audio frames in the media file aligned with the video frames.

The target range includes the video frames and the audio frames.

Based on the offset and the size of the target range, corresponding media data are extracted from an mdat box of the media file.

In one embodiment, the sender is further disposed to add the media data into a media source object in a media source extension interface.

A virtual address corresponding to the media source object is created by invoking the media source extension interface.

The virtual address is transmitted to the media element; the virtual address is configured for playing the media source object as a data source by the media element.

In one embodiment, the sender is further disposed to construct a fragmented media file based on media data satisfying the fixed time span when a media file to be played adopts a moving picture experts group-4 file format.

The fragmented file media is sent to the media element by a media source extension interface.

In one embodiment, it further includes a displayer disposed to distinguishingly display a fragment corresponding to preloaded media data and a fragment corresponding to non-preloaded media data in the webpage.

The embodiment of the disclosure also provides a readable storage medium, which may include: mobile storage apparatus, random access memory (RAM), read-only memory (ROM), magnetic disk or optical disk, and various media on which program code may be stored. The readable storage medium stores executable instructions.

The executable instructions are used for realizing the media-played loading control method when being executed by a processor.

The aforementioned contents merely are concrete embodiments of the disclosure, but the protective scope of the disclosure is not restricted thereto. Any modification or substitution within the technical scope disclosed by the disclosure that can easily be associated by a person skilled in the art should be included in the protective scope of the disclosure. Therefore, the protective scope of the disclosure should refer to those of the claims.

What is claimed is:

1. A media-played loading control method, comprising:
   in a playing process of a player built-in a webpage, detecting a time span corresponding to media data preloaded by the player;
   when the time span corresponding to preloaded media data is less than a fixed time span, obtaining media data enabling the preloaded media data to satisfy the fixed time span, wherein the obtaining media data enabling the preloaded media data to satisfy the fixed time span further comprises:
      positioning a first key frame in a media file, wherein decoding time of the first key frame is no later than end time of playing the preloaded media data,
      positioning a second key frame in the media file, wherein a difference value between decoding time of the second key frame and a start time of playing the preloaded media data is equal to the fixed time span, and
      extracting the media data between the first key frame and the second key frame from the media file; and
   sending obtained media data to a media element of the webpage for preloading through a media source extension interface.

2. The media-played loading control method according to claim 1, wherein the media-played loading control method further comprises:
   determining a time span adaptive to a network parameter of the webpage to be the fixed time span.

3. The media-played loading control method according to claim 2, wherein the determining a time span adaptive to a network parameter of the webpage to be the fixed time span comprises:
   based on a positive correlation of a download network bandwidth of transmitting media data and a data size of the preloaded media data, determining a data size of media able to be preloaded by the player; and
   determining a playing time span of the data size of the media able to be preloaded as the fixed time span.

4. The media-played loading control method according to claim 1, wherein the media-played loading control method further comprises:
   determining a time span adaptive to a characteristic parameter of the webpage to be the fixed time span.

5. The media-played loading control method according to claim 4, wherein the determining a time span adaptive to a characteristic parameter of the webpage to be the fixed time span comprises:
   obtaining a quantity of windows playing in the webpage; and
   based on a negative correlation of the quantity of the windows playing in the webpage and the fixed time span, determining the fixed time span.

6. The media-played loading control method according to claim 1, wherein the extracting the media data between the first key frame and the second key frame from the media file comprises:
   based on an offset and a size of video frames between the first key frame and the second key frame in the media file, and an offset and a size of audio frames aligned with the video frames in the media file, determining an offset and a size of a target range;
   wherein the target range comprises the video frames and the audio frames;
   based on the offset and the size of the target range, extracting corresponding media data from an mdat box of the media file.

7. The media-played loading control method according to claim 1, wherein the sending obtained media data to a media element of the webpage for preloading through a media source extension interface comprises:
  adding the media data into a media source object in a media source extension interface;
  creating a virtual address corresponding to the media source object by calling the media source extension interface; and
  transmitting the virtual address to the media element; wherein the virtual address is configured for playing the media source object as a data source by the media element.

8. The media-played loading control method according to claim 1, wherein the media-played loading control method further comprises:
  when a media file to be played adopts a moving picture experts group-4 file format, constructing a fragmented media file based on media data satisfying the fixed time span; and
  sending the fragmented file media to the media element by a media source extension interface.

9. The media-played loading control method according to claim 1, wherein the media-played loading control method further comprises:
  in the webpage, distinguishingly displaying a fragment corresponding to preloaded media data and a fragment corresponding to non-preloaded media data.

10. A media-played loading control device, comprising:
  at least one processor; and
  at least one memory communicatively coupled to the at least one processor and storing instructions that upon execution by the at least one processor cause the media-played loading control device to:
  detect a time span corresponding to media data preloaded by a player built-in a webpage in a playing process of the player;
  obtain media data enabling the preloaded media data to satisfy a fixed time span when the time span corresponding to preloaded media data is less than the fixed time span, wherein the instructions that cause the media-played loading control device to obtain media data enabling the preloaded media data to satisfy a fixed time span further comprise instructions that upon execution by the at least one processor cause the media-played loading control device to:
    position a first key frame in a media file; wherein decoding time of the first key frame is no later than an end time of playing the preloaded media data,
    position a second key frame in the media file; wherein a difference value between decoding time of the second key frame and a start time of playing the preloaded media data is equal to the fixed time span, and
    extract media data between the first key frame and the second key frame from the media file; and
  send obtained media data to a media element of the webpage for preloading through a media source extension interface.

11. The media-played loading control device according to claim 10, wherein the at least one memory further stores instructions that upon execution by the at least one processor cause the media-played loading control device to:
  determine a time span adaptive to a network parameter of the webpage to be the fixed time span.

12. The media-played loading control device according to claim 11, wherein the at least one memory further stores instructions that upon execution by the at least one processor cause the media-played loading control device to:
  determine media data whose size is able to be preloaded by the player based on a positive correlation of a download network bandwidth of transmitting the media data and a size of preloaded media data;
  determine a playing time span of the media data whose size is able to be preloaded as the fixed time span.

13. The media-played loading control device according to claim 10, wherein the at least one memory further stores instructions that upon execution by the at least one processor cause the media-played loading control device to:
  determine a time span adaptive to a characteristic parameter of the webpage to be the fixed time span.

14. The media-played loading control device according to claim 13, wherein the at least one memory further stores instructions that upon execution by the at least one processor cause the media-played loading control device to:
  obtain a quantity of playing windows in the webpage;
  based on a negative correlation of the quantity of playing windows in the webpage and the fixed time span, determine the fixed time span.

15. The media-played loading control device according to claim 10, wherein the at least one memory further stores instructions that upon execution by the at least one processor cause the media-played loading control device to determine an offset and a size of a target range based on an offset and a size of video frames between the first key frame and the second key frame in the media file, and an offset and a size of audio frames aligned with the video frames in the media file;
  wherein the target range comprises the video frames and the audio frames;
  based on the offset and the size of the target range, extracting corresponding media data from an mdat box of the media file.

16. The media-played loading control device according to claim 10, wherein the at least one memory further stores instructions that upon execution by the at least one processor cause the media-played loading control device to:
  add the media data into a media source object in a media source extension interface;
  create a virtual address corresponding to the media source object by calling the media source extension interface; and
  transmit the virtual address to the media element; wherein the virtual address is configured for playing the media source object as a data source by the media element.

17. The media-played loading control device according to claim 10, wherein the at least one memory further stores instructions that upon execution by the at least one processor cause the media-played loading control device to:
  construct a fragmented media file based on media data satisfying the fixed time span when a media file to be played adopts a moving picture experts group-4 file format;
  send the fragmented file media to the media element by a media source extension interface.

18. A non-transitory storage medium, storing an executable instruction, disposed to perform operations when the executable instruction is executed by a computing device, the operations comprising:
  in a playing process of a player built-in a webpage, detecting a time span corresponding to media data preloaded by the player;
  when the time span corresponding to preloaded media data is less than a fixed time span, obtaining media data enabling the preloaded media data to satisfy the fixed time span, wherein the obtaining media data enabling the preloaded media data to satisfy the fixed time span further comprises:

positioning a first key frame in a media file, wherein decoding time of the first key frame is no later than end time of playing the preloaded media data, positioning a second key frame in the media file, wherein a difference value between decoding time of the second key frame and a start time of playing the preloaded media data is equal to the fixed time span, and extracting the media data between the first key frame and the second key frame from the media file; and sending obtained media data to a media element of the webpage for preloading through a media source extension interface.

* * * * *